United States Patent
Huynh et al.

(10) Patent No.: US 9,862,482 B2
(45) Date of Patent: Jan. 9, 2018

(54) VARIABLE GEOMETRY FLUSH BOUNDARY DIVERTER

(71) Applicant: The Boeing Company, Chicago, IL (US)

(72) Inventors: Thuy Huynh, O'Fallon, MO (US); Eric Werner, Des Peres, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/846,356

(22) Filed: Sep. 4, 2015

(65) Prior Publication Data
US 2017/0066527 A1  Mar. 9, 2017

(51) Int. Cl.
*B64C 21/08* (2006.01)
*B64D 33/02* (2006.01)

(52) U.S. Cl.
CPC .............. *B64C 21/08* (2013.01); *B64D 33/02* (2013.01); *B64C 2230/06* (2013.01); *B64D 2033/0226* (2013.01)

(58) Field of Classification Search
CPC ............ B64D 33/02; B64D 2033/0226; B64D 2033/0253; B64D 2033/026; B64C 21/025; B64C 21/06; B64C 21/08; B64C 2230/06; F02C 7/04; F02C 7/042; F02C 7/045; F02C 7/057; F05D 2250/51; F05D 2270/17
See application file for complete search history.

(56) References Cited

U.S. PATENT DOCUMENTS

| 2,503,973 | A | * | 4/1950 | Smith | B64C 21/04 244/53 B |
| 2,950,594 | A | * | 8/1960 | Mitrovich | F02C 7/042 244/74 |
| 3,011,307 | A | * | 12/1961 | Edelfelt | F02C 7/042 137/15.1 |
| 3,240,445 | A | * | 3/1966 | Ellzey | B64C 21/04 244/207 |
| 3,314,629 | A | * | 4/1967 | Rethorst | B64C 30/00 244/1 N |
| 3,430,640 | A | * | 3/1969 | Lennard | F02C 7/042 137/15.1 |
| 4,086,761 | A | * | 5/1978 | Schaut | F02C 7/045 60/226.1 |
| 4,174,083 | A | * | 11/1979 | Mohn | B64D 33/02 137/15.1 |
| 4,620,679 | A | * | 11/1986 | Karanian | B64D 33/02 137/15.1 |
| 5,088,660 | A | * | 2/1992 | Karanian | B64D 33/02 137/15.2 |
| 5,116,251 | A | * | 5/1992 | Bichler | B64D 33/02 137/15.1 |
| 5,165,228 | A | * | 11/1992 | Enderle | F02C 7/042 137/15.1 |

(Continued)

*Primary Examiner* — Joseph W Sanderson
(74) *Attorney, Agent, or Firm* — Kolisch Hartwell, P.C.

(57) ABSTRACT

An airflow diverter system for an aircraft may include an external aircraft surface upstream from an engine inlet and a passage having an upstream opening adjacent the engine inlet. The passage may be configured to channel boundary airflow from the external aircraft surface away from the engine inlet. The diverter system may include an occlusion device configured to selectively open and close the opening to the passage.

19 Claims, 6 Drawing Sheets

(56) References Cited

U.S. PATENT DOCUMENTS

| | | | | |
|---|---|---|---|---|
| 5,167,117 A * | 12/1992 | Herzog | ............... | B64D 33/02 244/209 |
| 5,490,644 A * | 2/1996 | Koncsek | ............... | B64C 21/025 137/15.1 |
| 5,967,169 A * | 10/1999 | Engel | ............... | B64D 33/02 137/15.1 |
| 6,634,595 B2 * | 10/2003 | Koncsek | ............... | B64D 33/02 137/15.1 |
| 7,624,944 B2 * | 12/2009 | Parikh | ............... | B64C 21/00 137/15.1 |
| 7,762,077 B2 * | 7/2010 | Pederson | ............... | B64C 30/00 60/767 |
| 7,766,280 B2 * | 8/2010 | Cloft | ............... | B64D 33/02 244/208 |
| 7,861,968 B2 * | 1/2011 | Parikh | ............... | B64D 13/00 137/15.1 |
| 8,359,825 B2 * | 1/2013 | Alvi | ............... | B64D 33/02 137/15.2 |
| 8,739,514 B2 * | 6/2014 | Conners | ............... | B64D 33/02 137/15.1 |
| 9,272,772 B2 * | 3/2016 | Reckzeh | ............... | B64C 9/24 |
| 2004/0144077 A1 * | 7/2004 | Kobayashi | ............... | B64D 33/02 60/39.48 |
| 2014/0061387 A1 * | 3/2014 | Reckzeh | ............... | B64C 9/24 244/208 |
| 2014/0196436 A1 * | 7/2014 | Watanabe | ............... | F02C 7/042 60/204 |
| 2014/0283921 A1 * | 9/2014 | Lippinois | ............... | B64D 33/02 137/15.1 |

* cited by examiner

VARIABLE GEOMETRY FLUSH BOUNDARY DIVERTER

FIELD

The present invention relates generally to improving aircraft engine performance and decreasing observability of an aircraft. More specifically, the disclosed embodiments relate to systems and methods for changing the geometry of an inlet airflow boundary layer diverter.

BACKGROUND

Typical military aircraft often have an upstream air inlet that directs air back to the engine. As the aircraft moves through the air the boundary layer of air closest to the surface of the aircraft experiences drag. This drag reduces the speed of the air in the boundary layer with respect to the free stream of air farther away from the surface of the aircraft. The boundary layer may also have turbulence or other distortions due to interactions with the aircraft surface.

A boundary layer diverter is a passageway that directs the boundary layer of air away from the inlet, and thus, limiting low energy air from entering the engine. With a boundary layer diverter in place, the free stream air entering the inlet and into the engine will have a more uniform profile of pressure and speed across the inlet than would be the case without the diverter. Generally this will result in more efficient engine performance and decreased life cycle cost.

An aircraft with a boundary layer diverter may be less survivable and more observable than an equivalent aircraft without a diverter. This may be particularly true if the entrance to the passageway is visible from below or in front of the aircraft. The potential increase in observability may correspond to a decrease in survivability.

Thus, aircraft designers may be faced with the following choices: To design an aircraft whose engines perform as efficiently as possible all the time or to design an aircraft to be more survivable and less observable all the time.

SUMMARY

An airflow diverter system for an aircraft may include an external aircraft surface upstream from an engine inlet and a passage having an upstream opening adjacent the engine inlet. The passage may be configured to channel boundary airflow from the external aircraft surface away from the engine inlet. The diverter system may include an occlusion device configured to selectively open and close the opening to the passage.

Another airflow diverter system for an aircraft may include an external aircraft surface upstream from an engine inlet and a passage having an upstream opening adjacent the engine inlet. The passage may be configured to channel boundary airflow from the external aircraft surface away from the engine inlet. The diverter system may include a cover over the opening of the passage.

A variable-geometry bypass device for an aircraft engine air inlet may include a passage configured to direct a boundary layer of air away from an inlet to an engine of an aircraft. The device may include an adjustable door at an upstream end of the passage. The passage may have a downstream end located on a top surface of an aircraft wing.

A method for alternately improving performance of an engine of an aircraft and decreasing observability of the aircraft may include diverting a boundary layer of air through a bypass passage and away from an air inlet to an engine of an aircraft, thereby improving engine performance. The method may further include closing an upstream end of the bypass passage, thereby decreasing observability of the aircraft.

The present disclosure provides various apparatuses and methods of use thereof. In some embodiments an apparatus may include a moveable door at an upstream end of a bypass passage, the passage configured to direct a boundary layer of air away from an air inlet of an aircraft engine when the door is in an open position. In some embodiments the door may occlude the upstream end of the bypass passage when the door is in a closed position. In some embodiments the door may lie flush with an external surface of the aircraft when the door is in the closed position.

Features, functions, and advantages may be achieved independently in various embodiments of the present disclosure, or may be combined in yet other embodiments, further details of which can be seen with reference to the following description and drawings.

DESCRIPTION

Overview

Various embodiments of a variable geometry boundary layer diverter having an opening that can be closed and opened are described below and illustrated in the associated drawings. Unless otherwise specified, the diverter and/or its various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other airflow diverters. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

EXAMPLES, COMPONENTS, AND ALTERNATIVES

The following sections describe selected aspects of exemplary variable geometry boundary layer diverters as well as related systems and/or methods. The examples in these sections are intended for illustration and should not be interpreted as limiting the entire scope of the present disclosure. Each section may include one or more distinct inventions, and/or contextual or related information, function, and/or structure.

Example 1

This example describes an illustrative variable geometry boundary layer diverter, see FIGS. 1-6.

Figure 1:
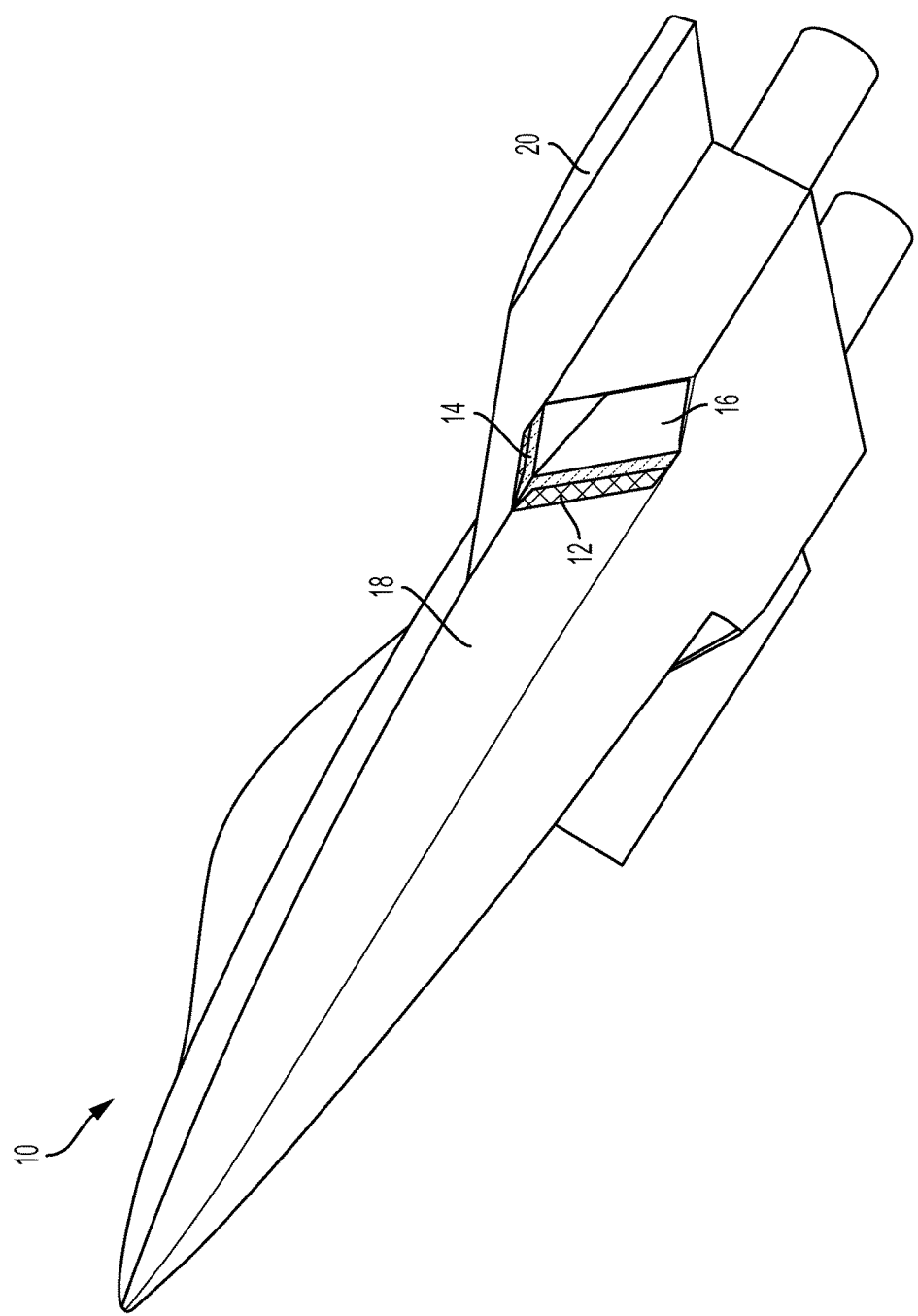
FIG. 1 is a perspective view of a portion of an aircraft, including two variable-geometry boundary layer diverters around an inlet of an engine.

FIG. 1 is a perspective view of a portion of an aircraft, generally indicated at 10, including two variable-geometry boundary layer diverters 12 and 14 around an inlet 16 of an engine. Aircraft 10 may optionally include diverter 12, diverter 14, or both diverters 12 and 14. Aircraft 10 may have one or more variable-geometry boundary layer diverters associated with each engine, for example, another engine not visible in the view of FIG. 1. A variable-geometry boundary layer diverter may be used on any aircraft, not just military aircraft such as is shown in FIG. 1.

For exemplary aircraft 10 the inlet 16 is located proximate a fuselage 18 of the aircraft and proximate an underside of a wing 20 of the aircraft. Diverter 12 may be disposed between inlet 16 and fuselage 18, while diverter 14 may be disposed between inlet 16 and the underside of wing 20. However, air inlets, and the corresponding boundary layer diverters, may have other locations relative to the rest of the aircraft. For example, an air inlet may be disposed underneath the fuselage, under a wing but not adjacent the fuselage, and adjacent the fuselage but not underneath a wing, among other positions. Regardless of the location of the air inlet, a variable-geometry boundary layer diverter may be disposed between the inlet and an adjacent external surface of the aircraft.

Figure 3:
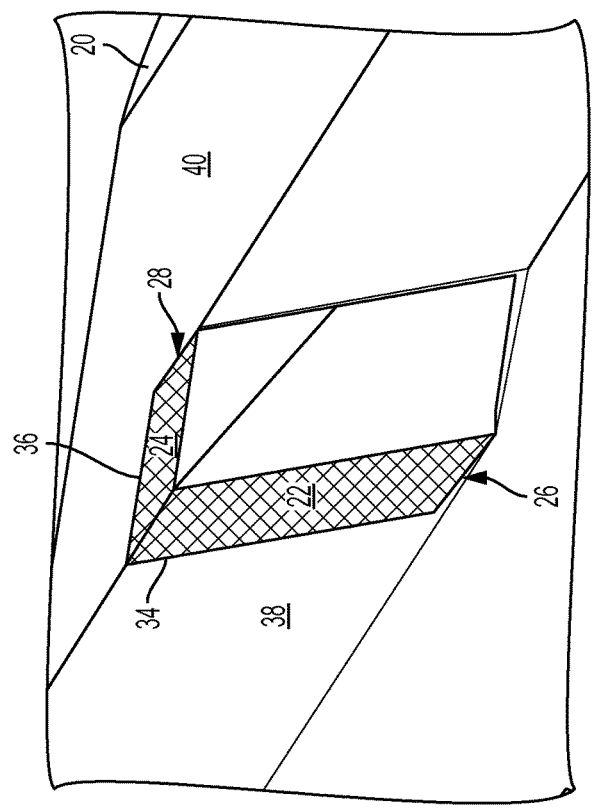
FIG. 3 is a zoomed in view of FIG. 1, showing doors of the boundary layer diverters in closed positions.
Figure 2:
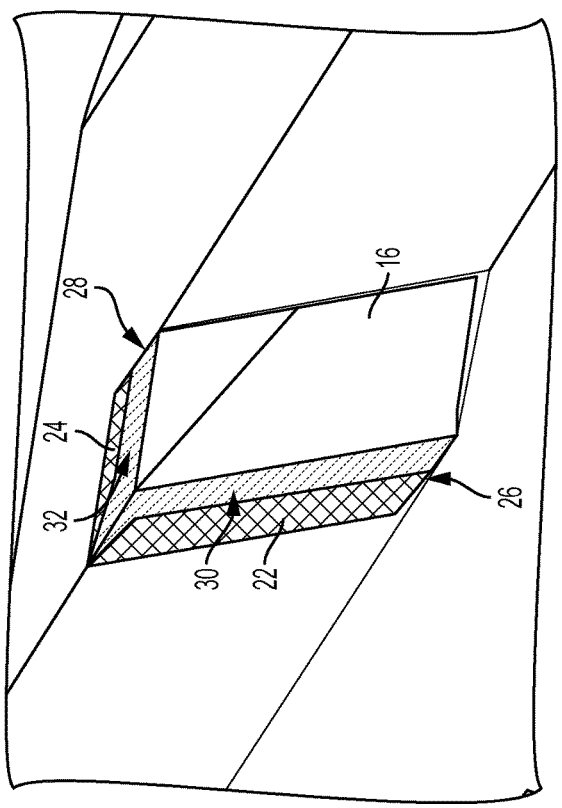
FIG. 2 is a zoomed in view of FIG. 1, showing doors of the boundary layer diverters in open positions.

FIGS. 2 and 3 are zoomed in views of FIG. 1. FIG. 2 shows the diverters in an open position and FIG. 3 shows the diverters in a closed position. Diverters 12 and 14 may include covers or surfaces 22 and 24, respectively. Surfaces 22 and 24 may be surfaces of, for example, doors disposed proximate upstream ends 26 and 28 of bypass passageways 30 and 32. In the exemplary embodiment shown in FIGS. 2 and 3, the doors may be operatively coupled to the aircraft via hinges proximate leading or upstream edges 34 and 36 of the doors.

The hinges may allow the doors to move between the open and closed positions. When in the open positions the doors may be disposed within the bypass passageways 30 and 32. Surfaces 22 and 24 may be configured so that air is allowed to enter the upstream ends 26 and 28 of the bypass passageways 30 and 32 when the surfaces are in the open position, thereby bypassing the inlet 16.

In the closed positions, surfaces 22 and 24 may occlude the upstream ends 26 and 28 of the bypass passages 30 and 32. That is, the surface may block, close up, obstruct, or otherwise seal the upstream ends of the bypass passages. In the closed positions, the surfaces 22 and 24 may be substantially flush with a moldline of the aircraft. For example, in the closed position surface 22 may be substantially coplanar with an upstream surface 38 of the aircraft adjacent surface 22 so that the combined surfaces 22 and 38 are smooth across the boundary between surfaces 22 and 38 which may be leading edge 34. If surface 38 is curved, surface 22 may substantially continue the curve of surface 38 when surface 22 is in the closed position. Similarly, surface 24 may be substantially flush with an undersurface 40 of wing 20.

Generally, either of surface 22 and 24 may be any appropriate occlusion device configured to selectively open and close the upstream opening to the passage adjacent the engine inlet. The passage may be configured to channel boundary airflow from the external aircraft surface away from the engine inlet.

Figure 4:
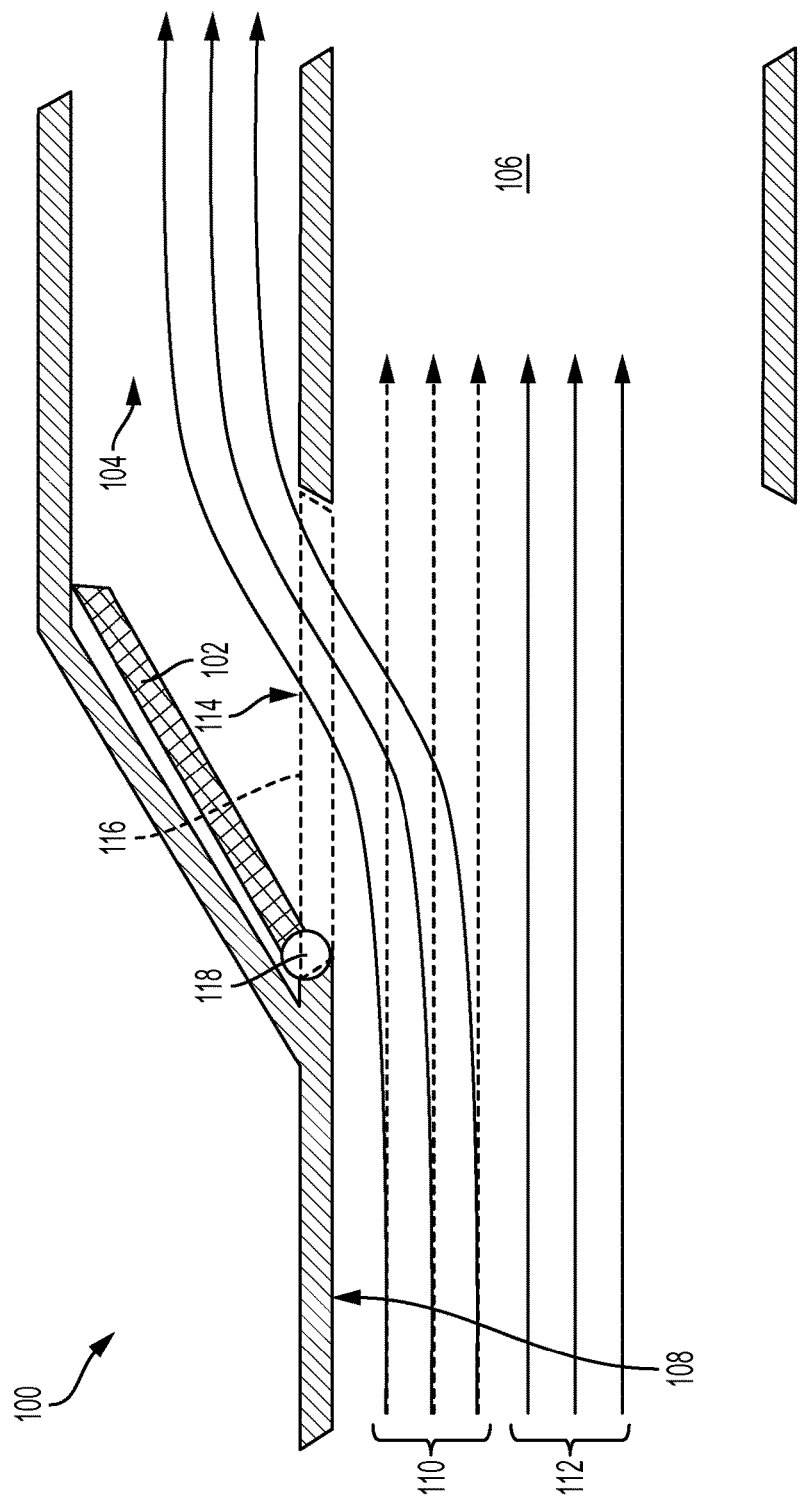
FIG. 4 is a schematic sectional view of an entrance to a variable-geometry boundary layer diverter, showing an embodiment of a door in an open position.

FIG. 4 is a schematic sectional view of an entrance to a variable-geometry boundary layer diverter, generally indicated at 100, showing an embodiment of a door or surface 102 in an open position. Diverter 100 may include door 102 and a passage 104 and may be configured to divert a flow of air around an air inlet 106 of an engine of an aircraft. Inlet 106 may be disposed proximate a surface 108 of an aircraft. Surface 108 may be a surface of a portion of a fuselage, a surface of a portion of a wing, or any other aircraft surface.

A boundary layer 110 of air proximate surface 108 may experience drag as the aircraft moves. This drag may cause boundary layer 110 to move slower with respect to the surface 108 than a free stream of air 112 farther away from the surface. The boundary layer 110 may experience turbulence and other distortions due to interactions with the surface. The free stream 112 may not exhibit these distortions and may have a substantially uniform profile of velocity and pressure across directions perpendicular to the direction of travel of the aircraft. That is, the border between the boundary layer and the free stream may be defined by a substantial decrease in the influence of the surface on the movement of the air in the layers.

If the boundary layer 110 and the free stream of air 112 were both to enter inlet 106 then the profile of velocity and pressure across the inlet would be less uniform than if only the free stream 112 were allowed to enter. A decrease in the uniformity of incoming air may cause the engine to operate less efficiently. Removing the boundary layer 110 from the air allowed to enter the inlet may then yield a better-performing inlet system, minimize fuel usage, and ultimately reduce the life-cycle cost of the aircraft.

When door 102 is in the open position boundary layer 110 may enter passage 104, thereby bypassing inlet 106, as indicated by solid arrows of boundary layer 110. Passage 104 may have an opening 114 substantially aligned with a moldline or body line of the aircraft defined by surface 108. Passage 104 may be recessed, inset, or offset from the aircraft body line or another part of the external aircraft surface.

When door 102 is in a closed position, shown at 116 in dashed lines occluding opening 114, door 102 may be substantially flush with surface 108. That is, when in the closed position door 102 may continue the body line of the aircraft defined by surface 108. In the case where door or surface 102 is impermeable to air, door 102 may substantially prevent air from entering passage 104 when the door is in the closed position. Thus, the boundary layer 110 may enter inlet 106 when the door is in the closed position, as indicated by dashed arrows of boundary layer 110.

In an alternate case, door or surface 102 may have a degree of porosity. A porous door may be configured to allow air from the boundary layer to enter passage 104 even when the door is in the closed position. In this case the engine may retain some of the performance benefit of removing air from the boundary layer while the door is in the closed position. Porous surface 102 may be permanently fixed in the closed position.

When door 102 is in the open position passage 204 may be considered a kind of cavity and opening 114 may be considered a gap in the outer surface of the aircraft. The presence of cavities or gaps in the surface of the aircraft may increase the observability of the aircraft, particularly when those cavities or gaps are viewable from in front or below the aircraft. By having passage 204 recessed or offset from the aircraft body line, opening 114 of passage 204 may be less viewable from a vantage point in front of the aircraft. Moving door 102 into the closed position flush with the body line of the aircraft may substantially eliminate the gap associated with the opening 114 and the cavity associated with the passage 104, thereby improving survivability of the aircraft.

A benefit of a variable-geometry boundary layer flow diverter, such as diverter 100, is the ability to change from a first configuration designed to improve engine performance when the door is in the open position to a second configuration designed to improve survivability when the door is in the closed position. In the case where the surface 102 is porous, diverter 100 may provide some measure of both advantages where some of the boundary layer is diverter into the passage despite the surface being in the closed position while also decreasing observability.

The specific mechanism by which door or surface 102 moves between the open and closed positions is not fixed. In the exemplary embodiment shown in FIG. 4, door 102 may be attached to surface 108 via a hinge 118 or some other moveable joint. An appropriate actuator may move the door between the open and closed positions as the door rotates or pivots around hinge 118. The door may rotate into passage 104 as it moves from the closed to the open positions. Door 102 may be allowed to be held at any position between the open and closed positions. Another exemplary opening and closing mechanism is shown schematically in FIG. 5.

Figure 5:
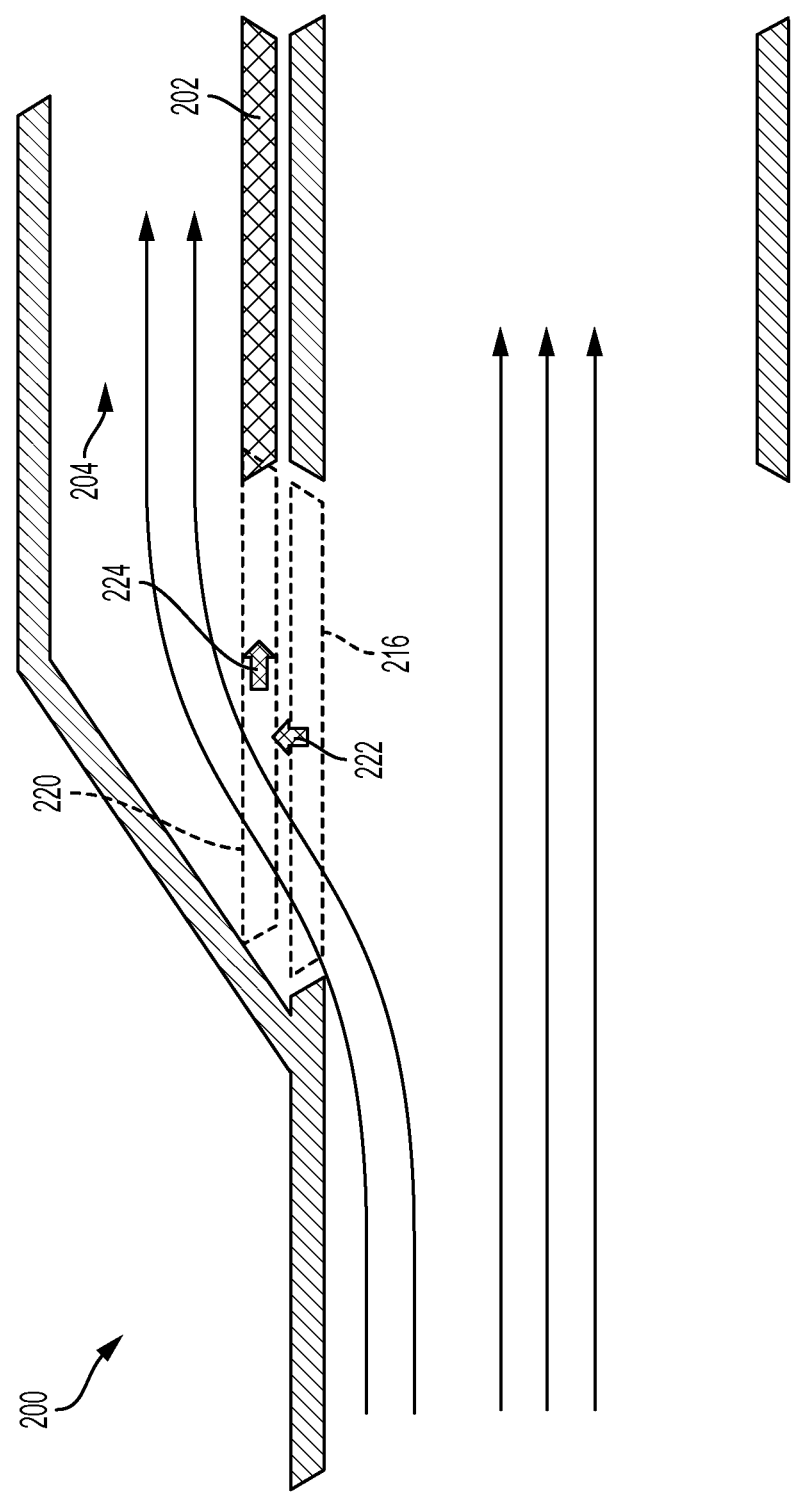
FIG. 5 is a schematic sectional view of an entrance to a variable-geometry boundary layer diverter, showing another embodiment of a door in an open position.

FIG. 5 is a schematic sectional view of an entrance to a variable-geometry boundary layer diverter, generally indicated at 200, showing another embodiment of a door or surface 202 in an open position. Like numbers for diverters 100 and 200 correspond to like elements. For example, bypass passage 204 may be substantially similar to passage 104.

Door 202 may slide between the open position and the closed position. That is, door 202 may move from a closed position, indicated in dashed lines at 216, to the open position by first moving through an intermediate position, indicated in dashed lines at 220. With respect to passage 204, door 102 may move inwards from the closed position 216 to intermediate position 220, as indicated by direction arrow 222, and then move downstream from intermediate position 220 to the open position, as indicated by direction arrow 224. Door 202 may reverse this process to move from the open position to the closed position. As with door 102, door 202 may be held at any position between the open and closed positions.

Doors 102 and 202 may be any appropriate cover configured to be selectively moveable between an open position and a closed position. Door 102 may be pivotable between the open position and the closed position and door 202 may be slideable between the open position and the closed position. Either variable-geometry boundary layer diverter 100 or 200 may be used for diverter 12 or diverter 14 in FIGS. 1-3.

Figure 6:
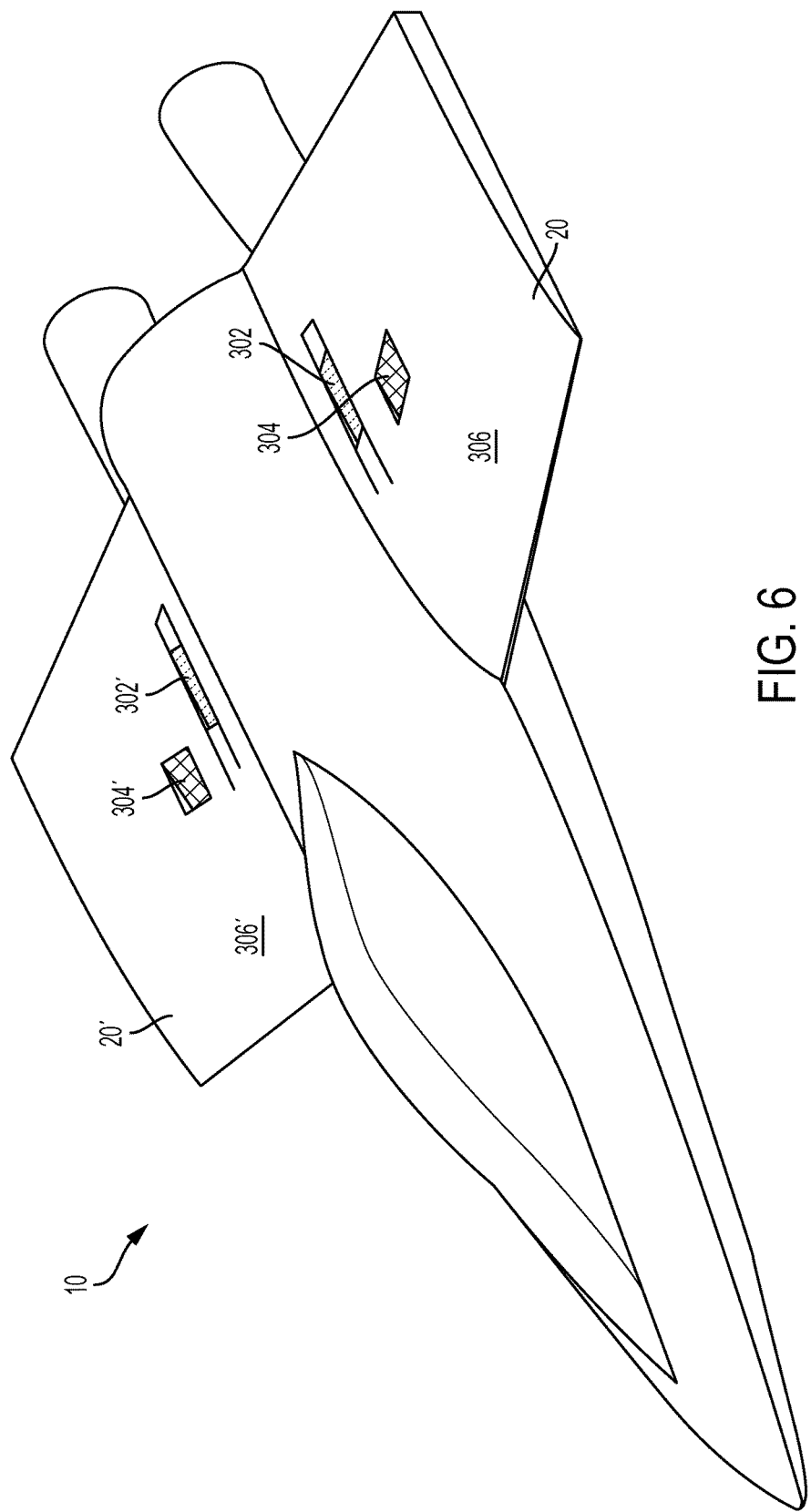
FIG. 6 is a perspective view of the portion of the aircraft of FIG. 1, showing exits of the boundary layer diverters on a top side of the wings.

FIG. 6 is a perspective view of the portion of aircraft 10 of FIG. 1, showing exits of the boundary layer diverters on a top side of the wings 20 and 20'. In the following primed numbers refer to corresponding elements on the left and right sides of the aircraft.

Passageways 30 and 32 may have downstream ends 302 and 304 respectively. The downstream ends 302 and 304 may disposed on a top surface 306 of wing 20. During typical flight operation of aircraft 10 lift is generated by a difference in air pressure, where higher pressure air is below the wing and lower pressure air is above the wing. If the upstream ends 26 and 28 of the passageways 30 and 32 are on an underside of wing 20 and the downstream ends 302 and 304 are on top surface 306 then there may a difference in pressure from the upstream to the downstream ends. If the pressure at the downstream ends is lower the air in the boundary layers may be drawn into the passageways, thereby bypassing the air inlet to the engine.

As noted above, the presence of cavities and gaps in the surface of the aircraft may increase the observability of the aircraft. However, this may primarily be of concern when the cavities and gaps are viewable from in front of and below the aircraft. Thus, positioning the downstream ends 302 and 304 of the passageways on the top surface 306 of wing 20 may have minimal effect on the observability of aircraft 10.

Example 2

Figure 7:
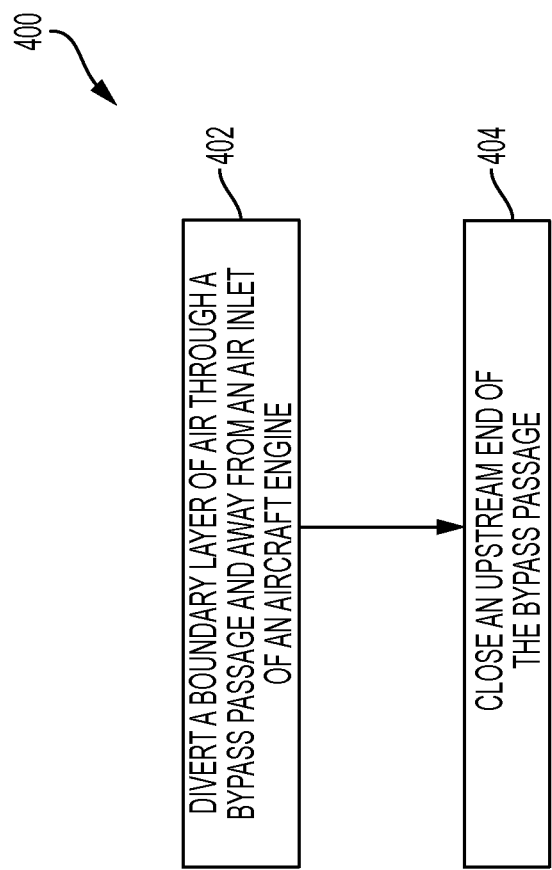
FIG. 7 is a flow chart illustrating a method of altering the geometry of an inlet bypass device of an aircraft engine.

This example describes an illustrative method for using a variable-geometry boundary layer airflow diverter, which may be used in conjunction with any of the apparatuses described herein; see FIG. 7.

FIG. 7 depicts multiple steps of a method, generally indicated at 400 for alternately improving performance of an engine of an aircraft and decreasing observability of the aircraft. Method 400 may be used in conjunction with any of the variable-geometry boundary airflow diverters depicted in and described in reference to FIGS. 1-6. Although various steps of method 400 are described below and depicted in FIG. 7, the steps need not necessarily all be performed, and in some cases may be performed in a different order than the order shown.

Method 400 may include a step 402 of diverting a boundary layer of air through a bypass passage and away from an air inlet of an aircraft engine. For example, any of the variable-geometry boundary layer diverts 12,14, 100, or 200 described above may be used to divert a boundary layer of air through a bypass passage and away from an air inlet of an aircraft engine. Diverting the boundary layer away from the inlet may improve engine performance by creating a more uniform profile of air velocity and air pressure across the air inlet.

Method 400 may include a step 404 of closing an upstream end of the bypass passage. Closing the upstream end of the bypass passage may include closing a door disposed proximate the upstream end of the bypass passage. When the upstream end of the bypass passage is closed the door may be flush with a moldline of the aircraft. Alternately, closing the upstream end of the bypass passage may include selectively moving a cover over the opening of the passage. The cover may pivot, slide, or move in any other appropriate way to close the upstream end of the bypass passage.

Closing the upstream end of the bypass passage may decrease observability of the aircraft. Decreasing the observability of the aircraft may increase survivability.

The door, cover, or other surface used to close the upstream end of the bypass passage may be at least partially porous to permit airflow through the passage even when the upstream end of the bypass passage is closed.

The bypass passage may have a downstream end located on a top surface of a wing of the aircraft. Disposing the downstream end on a top surface of the wing may create a pressure differential within the bypass passage that may encourage air from the boundary layer to enter the bypass passage.

Example 3

This section describes additional aspects and features of embodiments, presented without limitation as a series of paragraphs, some or all of which may be alphanumerically designated for clarity and efficiency. Each of these paragraphs can be combined with one or more other paragraphs, and/or with disclosure from elsewhere in this application in any suitable manner. Some of the paragraphs below expressly refer to and further limit other paragraphs, providing without limitation examples of some of the suitable combinations.

- A1. An airflow diverter system for an aircraft, comprising an external aircraft surface upstream from an engine inlet, a passage having an upstream opening adjacent the engine inlet configured to channel boundary airflow from the external aircraft surface away from the engine inlet, and an occlusion device configured to selectively open and close the opening to the passage.
- A2. The occlusion device may include a door having an open position permitting airflow through the passage, and a closed position blocking airflow through the passage.
- A3. The door may pivot between the open position and the closed position.
- A4. The door may slide between the open position and the closed position.
- A5. The door may be flush with the external aircraft surface when the door is in the closed position.
- A6. The passage may be inset from the external aircraft.
- B1. An airflow diverter system for an aircraft, may include:
  an external aircraft surface upstream from an engine inlet, a passage having an upstream opening adjacent the engine inlet configured to channel boundary airflow from the external aircraft surface away from the engine inlet, and an occlusion device covering over the opening of the passage.
- B2. The occlusion device may be at least partially porous to permit airflow through the passage.
- B3. The occlusion device may be selectively moveable between an open position and a closed position.
- B4. The occlusion device may include a door which is pivotable between the open position and the closed position.
- B5. The occlusion device may include a door which is slideable between the open position and the closed position.
- B6. The external aircraft surface may be on a fuselage, the occlusion device being flush with the external aircraft surface.
- B7. The door may be flush with the external aircraft surface when the door is in the closed position.
- B8. The passage may be inset from the external aircraft surface.
- B9. The passage may have a downstream opening on a top surface of a wing.
- B10. The airflow diverter system may have multiple passages adjacent the engine inlet, each passage having an occlusion device covering an upstream opening to the passage.
- B11. The occlusion device of each passage may be selectively moveable between an open position and a closed position.
- C1. A variable-geometry bypass device for an aircraft engine air inlet, may include
  a passage configured to direct a boundary layer of air away from an inlet to an engine of an aircraft,
  an adjustable door at an upstream end of the passage, and
  a downstream end of the passage located on a top surface of an aircraft wing.
- C2. The adjustable door may have an open position configured to allow the boundary layer of air to enter the upstream end of the passage.
- C3. The adjustable door may have a closed position where the upstream end of the passage is occluded by the adjustable door.
- C4. The adjustable door may have a degree of porosity and be configured to allow air to enter the upstream end of the passage when the adjustable door is in the closed position.
- C5. The adjustable door may be flush with a moldline of the aircraft when the door is in the closed position.
- C6. The passage may be recessed from the moldline of the aircraft.
- D1. A method for alternately improving performance of an engine of an aircraft and decreasing observability of the aircraft, may include
  diverting a boundary layer of air through a bypass passage and away from an air inlet to an engine of an aircraft, thereby improving engine performance; and
  closing an upstream end of the bypass passage, thereby decreasing observability of the aircraft.
- D2. The closing step may include includes closing a door disposed proximate the upstream end of the bypass passage.
- D3. The door may be flush with a moldline of the aircraft when the upstream end of the bypass passage is closed.
- D4. The bypass passage may have a downstream end located on a top surface of a wing of the aircraft.
- E1. A variable-geometry airflow diverter, may include
  a surface having an open position and a closed position, the surface proximate an air inlet of an engine of an aircraft;
  wherein the surface is configured to reversibly move from the open position to the closed position, the open position allowing air to enter an upstream end of a bypass passage thereby bypassing the inlet, the surface occluding the upstream end in the closed position.
- E2. The surface may substantially prevent air from entering the bypass passage when the surface is in the closed position.
- E3. The surface may have a degree of porosity and is configured to allow air to enter the upstream end of the bypass passage when the surface is in the closed position.
- E4. The surface may be flush with a moldline of the aircraft when the surface is in the closed position.
- E5. The bypass passage may have a downstream end on a top surface of a wing of the aircraft.
- E6. The bypass passage may be configured to improve engine performance by diverting a boundary layer of air away from the inlet when the surface is in the open position.
- E7. The surface may be configured to improve survivability of the aircraft when the surface is in the closed position.

E8. The surface may be a surface of a door operatively coupled to a hinge, the hinge configured to allow the door to move between the open and closed positions.

E9. The surface may be a surface of a door configured to move from the closed position to the open position by moving in a downstream direction within the bypass passage.

E10. The bypass passage may be disposed between the engine and a fuselage of the aircraft.

F1. A method for altering the geometry of an inlet bypass passage of an aircraft engine, may include steps of:

opening a door disposed proximate an upstream end of a bypass passage, the door adjacent an inlet to an aircraft engine; and closing the door, thereby occluding the upstream end of the bypass passage.

F2. The opening step may include allowing a boundary layer of air to enter the bypass passage, thereby bypassing the aircraft engine.

ADVANTAGES, FEATURES, BENEFITS

The different embodiments of the boundary layer airflow diverters described herein provide several advantages over known solutions for diverting a boundary layer of air around an inlet to an engine. For example, the illustrative embodiments of diverters described herein allow the diverters to be selectively and reversibly opened and closed. Additionally, and among other benefits, illustrative embodiments of the diverters described herein allow the aircraft to be alternately optimized for engine performance or survivability. No known system or device can perform these functions. However, not all embodiments described herein provide the same advantages or the same degree of advantage.

CONCLUSION

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only, and do not constitute a characterization of any claimed invention. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Invention(s) embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the invention(s) of the present disclosure.

We claim:

1. An airflow diverter system for an aircraft, comprising an external aircraft surface on a fuselage wall upstream from an engine inlet, a passage through the fuselage wall having an opening upstream from the engine inlet and visible from below or in front of the aircraft, configured to channel boundary airflow from the external aircraft surface away from the engine inlet, and a door covering the opening of the passage, the door being selectively moveable between an open position and a closed position, and being flush with the external aircraft surface when the door is in the closed position.

2. The airflow diverter system of claim 1, wherein the door is at least partially porous to permit airflow through the passage.

3. The airflow diverter system of claim 1, wherein the door is pivotable between the open position and the closed position.

4. The airflow diverter system of claim 1, wherein the door is slideable between the open position and the closed position.

5. The airflow diverter system of claim 1, wherein the passage is inside the fuselage wall.

6. The airflow diverter system of claim 1, wherein the passage has a downstream opening on a top surface of a wing.

7. The airflow diverter system of claim 1, comprising one or more additional passages adjacent the engine inlet, each additional passage having an occlusion device covering an upstream opening to the passage.

8. The airflow diverter system of claim 7, wherein the occlusion device of each additional passage is selectively moveable between an open position and a closed position.

9. A variable-geometry bypass device for an aircraft, the bypass device comprising:

a passage configured to direct a boundary layer of air away from an inlet of an engine of an aircraft, the passage being upstream from the inlet, and visible from below or in front of the aircraft, an adjustable door at an upstream end of the passage, a downstream end of the passage located on a top surface of an aircraft wing, wherein the adjustable door is flush with a moldline of the aircraft when the door is in a closed position.

10. The device of claim 9, wherein the adjustable door has an open position configured to allow the boundary layer of air to enter the upstream end of the passage.

11. The device of claim 9, wherein the adjustable door has a degree of porosity and is configured to allow air to enter the upstream end of the passage when the adjustable door is in the closed position.

12. The device of claim 9, wherein the passage is recessed from the moldline of the aircraft.

13. A method for alternately improving performance of an aircraft and decreasing observability of the aircraft, the method comprising:

diverting a boundary layer of air through a bypass passage and away from an air inlet of an engine of an aircraft, thereby improving engine performance, wherein the bypass passage is upstream from the inlet, and visable from below or in front of the aircraft and diverting a boundary layer of air through a bypass passage includes diverting air through a door having a degree of porosity; and closing an upstream end of the bypass passage, thereby decreasing observability of the aircraft.

14. The method of claim 13, wherein closing the upstream end of the bypass passage includes closing a door disposed at the upstream end of the bypass passage.

15. The method of claim 14, wherein the door is flush with a moldline of the aircraft when the upstream end of the bypass passage is closed.

16. The method of claim 14, wherein the bypass passage has a downstream end located on a top surface of a wing of the aircraft.

17. The method of claim 14, wherein closing a door includes at least one of swinging a door closed and sliding a door closed.

18. The method of claim 13, further comprising directing bypassed air out a top surface of an aircraft wing.

19. The method of claim 13, further comprising opening the closed end of the bypass passage.

* * * * *